United States Patent [19]

Keryk et al.

[11] Patent Number: 4,609,574

[45] Date of Patent: Sep. 2, 1986

[54] SILICONE RELEASE COATINGS CONTAINING HIGHER ALKENYL FUNCTIONAL SILOXANES

[75] Inventors: John R. Keryk, Mills Township, Midland County; Peter Y. K. Lo; LeRoy E. Thayer, both of Midland, all of Mich.

[73] Assignee: Dow Corning Corporation, Midland, Mich.

[21] Appl. No.: 783,715

[22] Filed: Oct. 3, 1985

[51] Int. Cl.$^4$ .............................................. B05D 1/36
[52] U.S. Cl. ................... 427/407.1; 427/411; 528/15; 528/31; 528/32; 428/447; 428/448; 428/452
[58] Field of Search ............................ 427/411, 407.1; 428/447, 452, 448; 528/15, 31, 32

[56] References Cited

U.S. PATENT DOCUMENTS

| | | | |
|---|---|---|---|
| 3,350,351 | 10/1967 | Hansen et al. | 260/46.5 |
| 3,445,420 | 5/1969 | Kookootsedes et al. | 260/37 |
| 3,907,852 | 9/1975 | Oswald et al. | 260/448.2 |
| 4,347,346 | 8/1982 | Eckberg | 528/15 |
| 4,476,166 | 10/1984 | Eckberg | 427/387 |
| 4,504,645 | 3/1985 | Melancon | 528/15 |

FOREIGN PATENT DOCUMENTS 1518371 7/1978 United Kingdom .

*Primary Examiner*—Melvyn I. Marquis
*Attorney, Agent, or Firm*—James E. Bittell

[57] ABSTRACT

An improved, curable, silicone, release coating composition is provided which cures more rapidly, at lower temperature, and with less residual reactive functionality. The composition contains siloxane polymers bearing higher alkenyl groups with 6 or more carbon atoms and cures by the metal catalyzed reaction of SiH with the alkenyl groups. An improved on-line process for preparing release laminates of substrates and adhesive using the coating composition is further provided.

30 Claims, No Drawings

SILICONE RELEASE COATINGS CONTAINING HIGHER ALKENYL FUNCTIONAL SILOXANES

BACKGROUND OF THE INVENTION

This invention relates to an improved composition and process for treating substrates to aid in the release of adhesive materials therefrom. Specifically, this invention relates to silicone compositions which cure by the metal catalyzed reaction of SiH groups with olefin groups. More particularly, this invention relates to silicone compositions which cure more rapidly, at lower temperature, and with less residual reactive functionality so that subsequent interaction with applied adhesive is minimized.

The application of curable silicone compositions to substrates such as paper to aid in the release of adhesive materials therefrom is old and well known in the coatings art. For example, the preparation of laminates consisting of a release paper and a sheet material which may be a decorative lamina or a label material coated with a pressure sensitive adhesive is well known. When it is desired to use the coated sheet material and finally affix it, the release paper is stripped off and discarded.

In the preparation of laminates of release paper and a supported adhesive film, one of two processes is normally used. In one process, the off-line process, the silicone composition is coated on paper and cured, then at a subsequent stage, normally after reeling and storing, an adhesive film supported on a sheet material is applied to the coated paper and the assembly is pressed together. In the other process, the in-line process, the silicone composition is applied to paper and cured, the adhesive is then coated on the silicone composition and the supporting sheet material is then applied to the adhesive and the assembly pressed together. While the in-line process is generally more efficient and would normally be more advantageous, it has been found that some adhesives bond or weld to the silicone coated paper if the adhesive is applied to the silicone coated paper within a short time after the silicone composition has been cured. It is believed that residual SiH functionality in the silicone is responsible for the bonding of the silicone and adhesive in the in-line process. The release problem is not usually observed with the off-line process, apparently because the off-line storage period allows for continued reaction and depletion of the reactive functionality of the silicone composition.

It has been suggested by Garden, U.K. Pat. No. 1,518,371, that the in-line weld problem can be reduced by incorporating certain compounds into the adhesive which will inhibit or prevent the bonding interaction between the silicone coating and the adhesive. Although this approach is successful in reducing the weld problem when certain compounds are added to the adhesive, there is still a need for a solution to the problem that does not require the addition of special chemicals to the adhesive component.

Recently there has been interest in applying silicone release coatings to new substrates such as polyethylene sheets which are less stable at the elevated temperatures used to cure the silicone release coating. Consequently there is a need for silicone coatings which cure at reduced temperatures. Of course, lower temperature curing or faster curing silicone coatings are also desired for energy conservation and more efficient production processes.

Silicone compositions which are curable by the metal catalyzed reaction of SiH functional siloxane polymers with vinyl functional siloxane polymers are well known. Kookootsedes et al., U.S. Pat. No. 3,445,420, describes curing compositions using vinyl functional siloxane polymers and generically discloses that any resin or fluid siloxane polymer containing at least one terminally unsaturated monovalent olefin radical per molecule can be used in a wide range of curing compositions useful as elastomers, potting compounds, sealants, dielectric gels, resins, coatings and the like. Kookootsedes et al. further teaches that a methylphenyl-5-hexenylsiloxane-endblocked terpolymer of equal moles of diphenylsiloxane, dimethylsiloxane, and phenylmethylsiloxane units, having a viscosity of 50,000 cs. at 25° C., forms a curable composition when mixed with an appropriate SiH functional siloxane and metal catalyst.

Eckberg, U.S. Pat. Nos. 4,347,346 and 4,476,166, and Melancon, U.S. Pat. No. 4,504,645, further teach vinyl containing siloxane polymers as components of similar curable silicone compositions for release coatings on paper. Again these patents disclose in general terms that any siloxane polymer within a broad genus of olefinorganopolysiloxanes could be used to form similar curable compositions. For example, it is taught that the olefinorganopolysiloxane may include alkenyl radicals such as vinyl, allyl, methallyl, butenyl, pentenyl, and the like.

Oswald et al., U.S. Pat. No. 3,907,852, teach the selective monoaddition of silanes to $\alpha,\omega$-dienes to form $\omega$-alkenylsilanes which are then reacted with phosphine to form silylalkyl phosphines.

Hansen et al., U.S. Pat. No. 3,350,351, teach free radical vulcanization of a copolymer consisting of 40 mol percent 3-cyanopropylmethylsiloxane units, 58 mol percent of dimethylsiloxane units and 2 mol percent of 7-octenylmethylsiloxane units.

SUMMARY OF THE INVENTION

It is an object of this invention to provide an improved curable silicone coating composition that can be used in the in-line process for making laminates without the problem of bonding or welding between the silicone coating and the adhesive. It is a further object to provide a curable silicone coating composition that has an adequate pot life at room temperature, but cures more rapidly at elevated temperatures or cures rapidly at less elevated temperatures.

The curable coating composition of the present invention comprises (A) a triorganosiloxane-endblocked polydiorganosiloxane polymer having a viscosity at 25° C. of at least 25 centistokes, wherein 90 to 99.5 percent of all organic radicals are methyl, from 0.5 to 10 percent of all organic radicals are unsaturated radicals independently selected from the group consisting of the vinyl radical and higher alkenyl radicals represented by the formula —R(CH$_2$)$_m$CH=CH$_2$ wherein R denotes —(CH$_2$)$_n$— or —(CH$_2$)$_p$CH=CH— and m has the value of 1, 2, or 3; n has the value of 3 or 6; and p has the value of 3, 4, or 5, with the proviso that at least 50 mole percent of the unsaturated radicals are higher alkenyl radicals; (B) a catalytic amount of a metal, hydrosilylation catalyst; (C) a methylhydrogenpolysiloxane crosslinking agent, compatible with (A) and having an average of at least three silicon-bonded hydrogen atoms per molecule; (D) an effective amount of an inhibitor for the metal, hydrosilylation catalyst; and wherein the composition contains 0.8 to 1.5 silicon-bonded hydrogen radicals for every unsaturated radical in the composition.

The present invention further comprises an in-line process for preparing a laminate of a substrate and an adhesive wherein the above described curable coating composition is employed to coat the substrate.

DETAILED DESCRIPTION OF THE INVENTION

The curable compositions of the present invention include an olefinic polydiorganosiloxane, a metal hydrosilylation catalyst, a methylhydrogenpolysiloxane, and an inhibitor for the metal hydrosilylation catalyst.

Olefinic polydiorganosiloxanes most useful in this invention are triorganosiloxane-endblocked polymers having a viscosity at 25° C. of at least 25 centistokes. It is preferred that the polymer have a viscosity at 25° C. of 100 to 1000 centistokes so that coating compositions containing the polymer can be easily applied to substrates without adding significant amounts of solvent. It is even more preferred that the polymer have a viscosity at 25° C. of 200 to 600 centistokes so that solventless coating compositions containing the polymer will not soak into or penetrate substrates such as paper to an undesirable degree and will provide more durable cured coatings.

The olefinic polymers are made up of diorganosiloxane units of the formula $R_2'SiO$ and chain terminating unit of the formula $R_3'SiO_{1/2}$ wherein $R'$ denotes a methyl radical or a hydrocarbon radical containing terminal unsaturation. Generally the $R'$ radicals in the polymers are 90 to 99.5 mole percent methyl radicals and 0.5 to 10 mole percent hydrocarbon radicals containing terminal unsaturation. The unsaturated radicals are independently selected from the group consisting of the vinyl radical and higher alkenyl radicals represented by the formula $—R(CH_2)_mCH=CH_2$ wherein R denotes $—(CH_2)_n—$ or $—(CH_2)_pCH=CH—$ and m has the value of 1, 2, or 3; n has the value of 3 or 6; and p has the value of 3, 4, or 5. At least 50 mole percent of the unsaturated radicals are higher alkenyl radicals. It has been found that siloxane polymers containing the higher alkenyl radicals react faster and more completely than the vinyl containing polymers in the metal catalyzed cure reaction with SiH functional polymers. Consequently, it is more preferred that essentially all unsaturated radicals in the polymer be higher alkenyl radicals.

The higher alkenyl radicals represented by the formula $—R(CH_2)_mCH=CH_2$ contain at least 6 carbon atoms. For example, when R denotes $—(CH_2)_n—$, the higher alkenyl radicals include 5-hexenyl, 6-heptenyl, 7-octenyl, 8-nonenyl, 9-decenyl, and 10-undecenyl. When R denotes $—(CH_2)_pCH=CH_2—$, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl are preferred because of the more ready availability of the α,ω-dienes used to prepare the alkenylsiloxanes. It is more preferred that R denote $—(CH_2)_n—$ so that the radicals contain only terminal unsaturation and the most preferred alkenyl radical is the 5-hexenyl radical.

It is preferred that the olefinic polydiorganosiloxane polymer consist essentially of units selected from the group consisting of dimethylsiloxane units, trimethylsiloxane units, alkenylmethylsiloxane units, and alkenyldimethylsiloxane units. Examples of siloxane units which form the olefinic polydiorganosiloxanes of this invention include trimethylsiloxane units, dimethylsiloxane units, 5-hexenyldimethylsiloxane units, 5-hexenylmethylsiloxane units, dimethylvinylsiloxane units, methylvinylsiloxane units, dimethyl-7-octenylsiloxane units, methyl-7-octenylsiloxane units, 9-decenyldimethylsiloxane units, 9-decenylmethylsiloxane units, 5,9-decadienyldimethylsiloxane units, 6-heptenylmethylsiloxane units, and dimethyl-8-nonenylsiloxane units.

Specific examples of preferred olefinic polydiorganosiloxanes include $ViMe_2SiO(Me_2SiO)_{100}(HexMeSiO)_2SiMe_2Vi$, $ViMe_2SiO(Me_2SiO)_{200}(HexMeSiO)_{10}SiMe_2Vi$, $HexMe_2SiO(Me_2SiO)_{150}(HexMeSiO)_4SiMe_2Hex$ and $HexMe_2SiO(Me_2SiO)_{150}SiMe_2Hex$ where Me denotes the methyl radical and Hex denotes the 5-hexenyl radical. The most preferred olefinic polymer for the present invention is a 5-hexenyldimethylsiloxane end-blocked copolymer of dimethylsiloxane units and 5-hexenylmethylsiloxane units. Preferably, 1.0 to 4.0 mole percent of the diorganosiloxane units in the copolymer are 5-hexenylmethylsiloxane units.

The olefinic polydiorganosiloxanes that are employed in the coating composition of this invention can be prepared by several methods. For example, known polydiorganosiloxanes bearing reactive groups such as SiH may be reacted with an α,ω-diene such as 1,5-hexadiene. Alternatively, suitable olefinic polydiorganosiloxanes may be prepared from alkenyl substituted silanes or siloxanes using well known methods of hydrolysis and equilibration. It is usually preferred to prepare olefinic siloxanes by hydrolyzing a silane such as 5-hexenylmethyldichlorosilane in excess water and then equilibrating the resulting hydrolyzate with cyclopolydimethylsiloxanes and a siloxane oligomer containing alkenyldimethylsiloxane end groups using a base catalyst such as KOH. However, it is believed that the olefinic polydiorganosiloxanes of this invention may also be advantageously prepared in a one-step acid-catalyzed process wherein a silane such as 5-hexenylmethyldichlorosilane is hydrolyzed and simultaneously equilibrated with cyclopolydimethylsiloxanes and 1,3-dialkenyl-1,1,3,3-tetramethyldisiloxane.

It should be noted that linear siloxanes produced by equilibration procedures may contain small amounts such as 0 to 15 weight percent of cyclopolydiorganosiloxanes which may be volatile at temperatures up to 150° C. For the purposes of this invention either siloxanes that still contain the small amounts of cyclics, or siloxanes from which the coproduced cyclics have been removed by volatilization may be used.

While olefinic polydiorganosiloxane is described as linear and to bear only hydrocarbon radicals on silicon, it is within the scope and spirit of this invention to permit the presence therein of trace amounts of non-linear siloxane units i.e. $SiO_2$, and $R'SiO_{3/2}$, wherein $R'$ is as described above, and trace amounts of other silicon-bonded radicals, such as hydroxyl and alkoxyl, which are normally incidentally in commercial polydiorganosiloxanes. Preferably, the olefinic polydiorganosiloxanes are free of the non-linear siloxane units and the other radicals.

Methylhydrogenpolysiloxane operates as a curing agent for the olefinic polydiorganosiloxane in the coating composition and therefore must be soluble therein and must contain an average of at least three, preferably more than three, silicon-bonded hydrogen radicals per molecule. By the name, methylhydrogenpolysiloxane, it is meant that at least three, but preferably all, silicon atoms therein which bear the hydrogen radicals also bear at least one methyl radical. For efficient curing of the composition, it is preferred that no silicon atom in the methylhydrogenpolysiloxane bear more than one silicon-bonded hydrogen radical. Methylhydrogenpolysiloxane may also contain silicon-bonded phenyl radicals and alkyl radicals having from 2 to 6 carbon atoms, provided that it is soluble in the olefinic polydiorganosiloxane.

Methylhydrogenpolysiloxane is preferably a fluid having a low viscosity, such as less than 100 centistokes at 25° C., thereby assisting in the reduction of the initial, i.e. uncured, viscosity of the coating composition. Generally, lower viscosity components are desirable in coating compositions to eliminate or reduce the need for solvents.

Preferred siloxane units which form the methylhydrogenpolysiloxane include, where Me denotes the methyl radical $Me_3SiO_{1/2}$, $Me_2HSiO_{1/2}$, $Me_2SiO$, $MeHSiO$, $MeSiO_{3/2}$, and $SiO_2$. Methylhydrogenpolysiloxane may also further comprise other siloxane units, such as $HSiO_{3/2}$, $PhHSiO$, $PhMeHSiO_{1/2}$, $PhMeSiO$ and $PhSiO_{3/2}$, provided that the resulting methylhydrogenpolysiloxane is soluble in the coating composition.

Examples of methylhydrogenpolysiloxane which are operative in the process of this invention include, but are not limited to, siloxanes consisting of $Me_3SiO_{1/2}$ units and MeHSiO units, siloxanes consisting of $Me_3SiO_{1/2}$ units, $Me_2SiO$ units and MeHSiO units, siloxanes consisting of $HMe_2SiO_{1/2}$ units, $Me_2SiO$ units and MeHSiO units, siloxanes consisting of $SiO_2$ units, $Me_3SiO_{1/2}$ units and $HMe_2SiO_{1/2}$ units, siloxanes consisting of $SiO_2$ units and $HMe_2SiO_{1/2}$ units, siloxanes consisting of HMeSiO units and siloxanes consisting of HMeSiO units and $Me_2SiO$ units.

Specific examples of suitable methylhydrogenpolysiloxanes that may be used in the compositions of this invention include $(HMe_2SiO)_4Si$, $(MeHSiO)_4$, $MeSi(OSiMe_2H)_3$, $PhSi(OSiMe_2H)_3$ and, preferably, higher molecular weight fluid siloxanes having the average formulae $Me_3SiO(MeHSiO)_{35}SiMe_3$, $Me_3SiO(Me_2SiO)_3(MeHSiO)_5SiMe_3$ and $HMe_2SiO(Me_2SiO)_3(MeHSiO)_5SiMe_2H$. The higher molecular weight methylhydrogenpolysiloxanes are preferred as curing component for silicone release compositions because the higher molecular weight methylhydrogenpolysiloxanes have a low volatility and will remain with and more effectively cure silicone release compositions at elevated temperatures.

Methylhydrogenpolysiloxanes are well known in the organosilicon polymer art; their preparation therefore needs no further elaboration here. As in the case of the preparation of vinyl-endblocked polydiorganosiloxanes, it should be noted that the preparation of methylhydrogenpolysiloxanes comprising diorganosiloxane units may co-provide small amounts of cyclopolydiorganosiloxanes. The presence or absence of these cyclopolydiorganosiloxane species in the methylhydrogenpolysiloxane is of no importance to this invention as long as the methylhydrogenpolysiloxane has an average of at least 3 silicon-bonded hydrogens per molecule.

Component (B) is any metal hydrosilylation catalyst that is effective to catalyze the addition reaction of silicon-bonded hydrogen radicals with silicon-bonded vinyl radicals in the well-known manner. Typically, component (B) is an active-metal-containing composition such as a platinum-containing compound or a rhodium-containing compound. Examples of these active-metal compositions include chloroplatinic acid, platinum deposited on a substrate, platinum complexed with organic liquids, such as ketones, vinylsiloxanes and ethylene, and complexes of rhodium halides. Preferably the hydrosilylation catalyst is soluble in the curable silicone release composition.

Hydrosilylation catalysts are well known in the organosilicon art and need no further delineation herein. For further details, if needed, the reader is directed to the teachings of Speier et al., U.S. Pat. No. 2,823,218; Willing, U.S. Pat. No. 3,419,593; Chandra, U.S. Pat. No. 3,890,359; Polmanteer et al., U.S. Pat. No. 3,697,473; Nitzsche et al., U.S. Pat. No. 3,814,731; and Sandford, U.S. Pat. No. 4,123,604.

The coating compositions of the present invention preferably contain an effective amount of (D), an inhibitor for the metal hydrosilylation catalyst. In the well known manner, preferred inhibitors reduce the activity of the metal catalyst at room temperature thus increasing the time period during which the composition may be used at room temperature while still allowing fast cure at elevated temperatures.

Hydrosilylation inhibitors fall into two general classes. One class is composed of materials that effectively inhibit hydrosilylation over a wide range of temperatures and can be volatilized out of the organosilicon composition to allow hydrosilylation to proceed. Examples of this class are pyridine (U.S. Pat. No. 3,188,299), acrylonitrile (U.S. Pat. No. 3,344,111), 2-ethenylisopropanol (U.S. Pat. No. 3,445,420), and perchloroethylene (U.S. Pat. No. 3,383,356). The other class of inhibitors are materials that are non-volatile; the inhibitory effect of these materials is overcome by heating, whereupon hydrosilylation takes place. Examples of this latter class are the reaction product of a siloxane having silicon-bonded hydrogen atoms, a platinum catalyst, and an acetylenic alcohol (U.S. Pat. No. 3,989,666 and U.S. Pat. No. 4,336,364), organic phosphines and phosphites (U.S. Pat. No. 3,188,300), benzotriazole (U.S. Pat. No. 3,192,181), organic sulfoxides (U.S. Pat. No. 3,453,234), metallic salts (U.S. Pat. No. 3,532,649), aminofunctional siloxanes (U.S. Pat. No. 3,723,567), ethylenically-unsaturated isocyanurates (U.S. Pat. No. 3,882,038), olefinic siloxanes (U.S. Pat. No. 3,933,880, U.S. Pat. No. 3,989,666, and U.S. Pat. No. 3,989,667), dialkyl carboxylic esters (U.S. Pat. No. 4,256,870 and U.S. Pat. No. 4,347,346) and unsaturated amides (U.S. Pat. No. 4,337,332).

For efficient curing, olefinic polydiorganosiloxane and methylhydrogenpolysiloxane are mixed in the coating compositions in amounts that will provide a composition containing 0.8 to 1.5 silicon-bonded hydrogen radicals for every unsaturated radical in the composition. Compositions containing 0.9 to 1.2 silicon-bonded hydrogen radical for every unsaturated radical in the composition, are more preferred in order to minimize residual reactive functionality after curing so that subsequent interaction with applied adhesive is prevented.

The amount of hydrosilylation catalyst to be used in the curable coating compositions is merely that amount that will catalyze the addition of silicon-bonded hydrogen to silicon-bonded alkenyl and provide the desired cure time at a particular curing temperature. A suitable catalytic amount of hydrosilylation catalyst can be determined by simple experimentation. When a composition-soluble, platinum catalyst is used, satisfactory curing can occur when the platinum catalyst is present in amounts sufficient to provide as little as one atom of platinum per million silicon bonded alkenyl radicals. Higher amounts of platinum such as one to ten platinum atoms per 1000 silicon-bonded alkenyl radicals can also be employed. Typically, platinum catalyst is used in sufficient amount to provide 0.5 to 200 ppm by weight of platinum in the coating composition.

Since rhodium-containing catalysts are somewhat less active, they are more typically employed in amounts sufficient to provide 5 to 400 ppm by weight of rhodium in the coating composition.

The curable coating composition may further contain additional components which do not adversely interfere with the curing of the composition or its use as a release agent. Specifically, the inclusion of controlled release additives, pigments, rheology control additives, substrate-adhesion promoters, and adjuvants to control substrate-penetration by the coating composition is contemplated within the scope of this invention.

More particularly, it should be noted that the use of controlled release additives such as the toluene soluble siloxane resins which are described as copolymers of (a) $(CH_3)_3SiO_{1/2}$ units, (b) alkenyldimethylsiloxane units, and (c) $SiO_2$ units, the ratio of the (a) and (b) units to (c) units being from 0.6:1 to 1.1:1 and the silicon-bonded hydroxy content of the copolymer being no more than 0.7 weight percent, is contemplated within the scope of the present invention. It is expected that the siloxane resins wherein the alkenyl group in the (b) siloxane units is represented by the formula $-R(CH_2)_mCH=CH_2$ wherein R denotes $-(CH_2)_n-$ or $-(CH_2)_pCH=CH-$ and m has the value of 1, 2, or 3; n has the value of 3 or 6; and p has the value of 3, 4, or 5 will be especially useful in the compositions of this invention because of their more rapid and complete cure with the other components of the compositions. When used, the release additives are typically employed in amounts of 5 to 45 percent by weight of the coating composition.

The coating composition may further contain up to 95 percent by weight of a volatile thinning medium having a normal boiling point of less than 150° C., such as a dispersant or a solvent, to aid in mixing and using the composition. A volatile thinning medium is advantageously employed when a high viscosity, i.e. 1000 cs or greater, olefinic polydiorganosiloxane is used and reduction of the viscosity of the coating composition is desired. It is preferred, however, to prepare the coating compositions of this invention with polysiloxanes of appropriate viscosity so that the compositions can be coated by many common methods without a thinning medium.

Coating compositions are prepared by mixing the desired amounts of the above described components and any additional components in any suitable manner such as by stirring, blending and/or tumbling and in any suitable order. Preferably the methylhydrogensiloxane and the hydrosilylation catalyst are brought together in a final mixing step.

Typically, curable coating compositions can be conveniently prepared by combining two non-curing compositions which, when mixed in proper proportions, will give rise to the curable coating composition. For example, one of the non-curing compositions may comprise a portion of the olefinic polydiorganosiloxane and the methylhydrogenpolysiloxane and another of the non-curing compositions comprises the balance of the olefinic polydiorganosiloxane, inhibitor and the hydrosilylation catalyst. Alternatively, one of the non-curing compositions may comprise all of the components except the methylhydrogensiloxane, which constitutes another non-curing composition to be mixed with the first non-curing composition at the proper time.

Any solid substrate may be treated by the compositions of this invention to provide release of adhesive materials therefrom. Examples of suitable substrates include cellulosic materials, such as paper, cardboard, and wood; metals, such as aluminum, iron, and steel; siliceous materials, such as ceramics, glass, and concrete; and synthetics, such as polyester, polyepoxide, and polyethylene. To assure proper curing and adhesion of the silicone coating, the substrate should be clean and free of materials which undesirably inhibit the cure of the release composition, such as materials containing amines, mercaptans and phosphines.

The curable coating compositions of this invention are particularly useful in a process for preparing a laminate of a substrate and an adhesive wherein the adhesive will release from the substrate, the process comprising the steps of: (I) coating the curable silicone composition of the present invention on the surface of the substrate; (II) curing the silicone release composition with an effective amount of heat; (III) applying, in-line, an adhesive to the silicone surface of the substrate.

In the process for preparing a laminate, the curable silicone composition of this invention may be coated on the surface of the substrate by any of the well known methods for coating flexible substrates such as brushing, dipping, spraying, trailing blade coater, knife over roll, reverse roll, and gravure. Any suitable amount of coating material may be applied to the substrate. Generally, a thin coating of the silicone release composition is employed such as approximately 0.1 to 2.0 grams per square meter of coated surface with about one gram per square meter of coated surface being preferred.

Heat curing of the silicone coating composition can be initiated in any convenient way such as by infrared lamps, by radiation, or by forced air oven which is often most suitable. Curing can be accomplished at any convenient temperature, but typically it is most advantageous to use temperatures above room temperature such as 50° C. to 150° C. with temperatures of 70° C. to 120° C. being preferred and temperatures of 70° C. to 90° C. being most preferred to provide rapid cure while conserving heat energy. An advantage of the present process is that more rapid cure times are obtained even at the lower temperatures such as 70° C. to 80° C.

In the process of this invention, the adhesive is applied in-line to the cured silicone surface of the substrate. By in-line, it is meant that the adhesive is applied to the silicone coated surface of the substrate within a short time after the curing of the silicone, and without reeling and storing the silicone coated substrate prior to the adhesive application step. Typically, the adhesive will be applied less than one hour after the silicone is cured and usually less than 5 minutes after the silicone is cured.

The adhesive may be applied by any of the well known methods such as by coating hot melt adhesives or solutions of adhesive resins in solvent, or by pressing an adhesive film supported on a sheet material to the silicone coated surface.

The type of adhesive material used in the process of this invention is not critical and any of the well known materials can be used. The process of the present invention is especially useful when employed with acrylic adhesives since these adhesives, when applied in line, bond or weld to the SiH-vinyl cured silicone coatings of the prior art. Acrylic adhesives contain polyacrylate elastomers and are well known for use in decals, tapes, and many other general purpose adhesive laminates.

The following examples are presented to illustrate the invention to those skilled in the art and should not be construed as limiting the invention, which is properly delineated in the appended claims. All proportions by parts or percents are by weight unless otherwise stated.

EXAMPLE 1

5-Hexenylmethyldichlorosilane was prepared by combining 1,5-hexadiene (160 g, 1.95 m), 0.1 g of a platinum complex

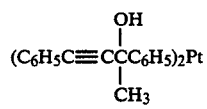

and methyldichlorosilane (5 g) in a flask equipped with a condenser and a thermometer. The mixture was heated to 40° C. to initiate the reaction. Additional methyldichlorosilane (120 g) was added dropwise to the mixture so that the temperature was kept below 55° C. The product was isolated in 87.6% yield by distillation under reduced pressure (bp 67°–9° C./2 mm Hg).

EXAMPLE 2

Hydrolyzate of 5-hexenylmethyldichlorosilane was prepared by adding water (225 g) to a mixture of the silane (100 g) in toluene (75 g) and stirring for 1.5 hours. The toluene layer was separated from the water and washed first with 10% aqueous sodium bicarbonate (115 ml) and then with three portions of water (75 ml). The residue was stripped on a rotary evaporator (92° C./8 mm Hg), treated with calcium chloride and activated charcoal, and filtered through a filter aid. The hydrolyzate was a lightly tinted fluid having a $-CH=CH_2$ content of 18.6% versus a theoretical value of 19.01%.

EXAMPLE 3

Siloxane polymer containing 5-hexenyl substituents was prepared by combining cyclopolydimethylsiloxanes (276.9 g), hydrolyzate from Example 2 (10.39 g), $(CH_3)_2(CH_2=CH)Si[OSi(CH_3)_2]_6$-.$_6OSi(CH=CH_2)(CH_3)_2$ (16.89 g), and potassium silanolate catalyst (1.79 g) and heating the mixture to 150° C. for 4 hours. The polymer was neutralized by bubbling carbon dioxide through it for 10 minutes and then filtered through diatomaceous earth. The product was stripped to 175° C. and 40 mm Hg to yield 240 g of water white fluid with viscosity of 310 cs at 25° C. The polymer had a $-CH=CH_2$ content of 1.12% and a residual potassium level of less than 0.5 ppm. This polymer is generally represented by the average formula

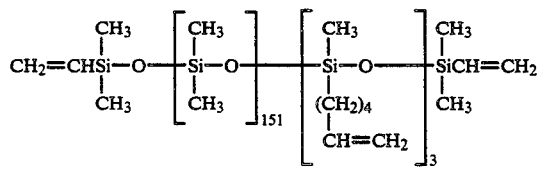

EXAMPLE 4

A paper coating composition was prepared by mixing the siloxane polymer from Example 3 (10 g), a platinum catalyst (0.19 g of soluble platinum complex formed from chloroplatinic acid and divinyltetramethyldisiloxane containing 0.67% platinum), bis(2-methoxy-1-methylethyl) maleate (0.1 g as a cure control additive), and methylhydrogenpolysiloxane crosslinker (0.47 g of a mixture containing 41.6% of trimethylsiloxane-endblocked polymethylhydrogensiloxane with an average of about 42 siloxane units per polymer molecule and 58.4% of trimethylsiloxane-endblocked copolymer with an average of 3 dimethylsiloxane units and 5 methylhydrogensiloxane units per copolymer molecule). The composition was coated onto S2S supercalendered kraft paper using a blade coater at 34 psi pressure to give approximately 1.3 grams of coating per square meter of surface. Coatings were cured at either 180° F. or 250° F. The coating was considered cured when a condition of no smear, no rub off, and no migration was found. The extent of rub off is determined by rubbing the coating with the index finger to see if it is removed. A coating is considered to show no migration if a piece of adhesive tape will stick to itself after having first been adhered to the coating and then removed and its adhesive-bearing surfaces doubled back on itself.

Each cured release coating was prepared for release testing by laminating immediately after curing with Monsanto ® GMS-263 acrylic adhesive (a registered trademark of Monsanto Company of St. Louis, Mo.) according to the following procedure. Acrylic adhesive solution was applied to the cured coating at a wet thickness of 3 mils using a Bird bar. The adhesive was heated at 70° C. for 60 seconds and then cooled to room temperature for 1 minute. A sheet of 60 pound matte litho was applied to the dried adhesive and the resulting laminate was rolled with a 4.5 pound rubber-coated roller and aged for 24 hours at room temperature.

Release testing of the laminates was accomplished by cutting the laminates into 1 inch wide strips and pulling the matte/adhesive lamina from the kraft paper/silicone lamina at an angle of 180 degrees at 400 inches per minute. The force, in grams per inch, that was required to separate the laminae was noted.

For comparsion, a coating composition was prepared and tested in the same manner except that an equivalent siloxane polymer containing vinyl groups instead of the hexenyl groups was used in place of the the siloxane polymer from Example 3. The release forces and minimum cure times for the coatings at two different temperatures are presented in Table 1.

TABLE 1

| Siloxane Polymer | Cure Temperature | Time | Release Force g/Inch |
|---|---|---|---|
| Hexenyl-containing | 180° F. | 60 sec. | 125 |
| Hexenyl-containing | 250° F. | 15 sec. | 90 |
| Vinyl Only | 180° F. | 70 sec. | No Release* |
| Vinyl Only | 250° F. | 15 sec. | 413 |

*Laminate tore when separation of laminae was attempted.

EXAMPLE 5

5-Hexenyldimethylchlorosilane was prepared by combining 1,5-hexadiene (164 g) and 0.05 g of platinum complex

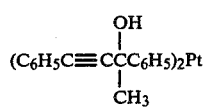

in a flask equipped with a condenser, addition-funnel and a thermometer. Dimethylchlorosilane (92 g) was added at such a rate that the pot temperature did not rise above 40° C. The mixture was allowed to stand at room temperature for 48 hours. The product was isolated in 68% yield by distillation under reduced pressure (bp 39°–40° C./2.2 mm Hg).

EXAMPLE 6

5-Hexenyl-endblocked polydimethylsiloxane fluid was prepared by combining 5-hexenyldimethylchlorosilane (124.27 g), hydroxyl-endblocked polydimethylsiloxane having about 4% silicon bonded hydroxyl groups (345 g), and toluene (100 g) in a flask and heating to reflux for 14 hours. After cooling, triethylamine (30 g) was added and the mixture stirred for two hours before filtering. The filtrate was stripped under vacuum to remove volatiles up to 100° C. at 1 mm Hg. The residue was decolorized by stirring with Fuller's Earth (5 g) for two hours and then filtered to yield 370.1 g of colorless polysiloxane fluid.

EXAMPLE 7

5-Hexenyl-endblocked copolymer of dimethylsiloxane units and 5-hexenylmethylsiloxane units was prepared by mixing cyclopolydimethylsiloxanes (654.34 g), hydrolyzate of 5-hexenylmethyldichlorosilane from Example 2 (27.1 g), 5-hexenyl-endblocked polydimethylsiloxane fluid from Example 6 (75.4 g), and KOH (0.38 g) in a flask and heating to 150° C. for 5 hours. After cooling, carbon dioxide was bubbled through the mixture for 30 minutes to neutralize the KOH. Fuller's Earth (5 g) was added and after 24 hours, the mixture was filtered to yield a copolymer generally conforming to the average formula

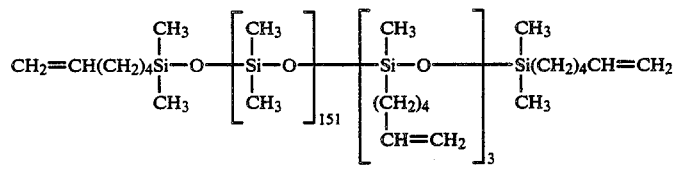

EXAMPLE 8

A paper coating composition was prepared as in Example 4 using the 5-hexenyl-endblocked copolymer of dimethylsiloxane units and 5-hexenylmethylsiloxane units prepared in Example 7 (10 g), a platinum catalyst (0.19 g of soluble platinum complex formed from chloroplatinic acid and divinyltetramethyldisiloxane containing 0.67% platinum), bis(2-methoxy-1-methylethyl) maleate (0.1 g as a cure control additive), and methylhydrogenpolysiloxane crosslinker (0.37 g of a mixture containing 60% of trimethylsiloxane-endblocked polymethylhydrogensiloxane with an average of about 42 siloxane units per polymer molecule and 40% of trimethyl-endblocked copolymer with an average of 3 dimethylsiloxane units and 5 methylhydrogensiloxane units per copolymer molecule). For comparison, a similar coating composition was prepared in the same manner except that an equivalent siloxane copolymer containing vinyl groups instead of the hexenyl groups was used in place of the siloxane copolymer prepared in Example 7. The coatings were cured for various times at temperatures of 160°–180° F. Acrylic release forces were determined for the compositions according to the procedures described in Example 4. The results are presented in Table 2.

For comparison, a portion of paper coated with the hexenyl siloxane composition, cured at 180° F. for 80 seconds, was aged 5 days prior to laminating with the acrylic adhesive (off-line process). The release force for this laminate was 67 g/inch. The equivalance of release values for off-line and in-line processing indicates that the presence of residual reactive functionality after the initial cure has been eliminated.

TABLE 2

| Siloxane Polymer | Temperature | Cure Time (seconds) | Release Force (g/inch) |
| --- | --- | --- | --- |
| Hexenyl | 180° F. | 60 | 91 |
| | 180° F. | 80 | 68 |
| | 170° F. | 80 | 109 |
| | 160° F. | 80 | Welding* |
| Vinyl | 180° F. | 80 | Welding* |

*Laminates welded together so that tearing occurred when separation attempted.

EXAMPLE 9

The cure rates of the hexenyl group containing siloxane composition of Example 8 and the similar vinyl group containing siloxane composition were compared by determining the minimum time required to reach a condition of no smear, no rub off, and no migration at various cure temperatures. The results are presented in Table 3. Even though the cure rate at the elevated temperature is substantially different, the bath life for the two compositions is similar with the hexenyl-containing composition having a bath life of about 5 hours and the vinyl-containing composition having a bath life of 6 to 8 hours. Bath life as used herein is the time period during which the coating composition doubles in viscosity when stored at 40° C. (104° F.).

TABLE 3

| Siloxane Polymer | Temperature | Minimum Time to Cure (seconds) |
| --- | --- | --- |
| Hexenyl | 180° F. | 45 |
| Vinyl | 180° F. | 80 |
| Hexenyl | 160° F. | 80 |
| Vinyl | 160° F. | 180 |

EXAMPLE 10

This example is presented to illustrate the faster reactivity of the 5-hexenylsilyl unit toward SiH in comparsion to vinylsilyl units. In this experiment model compounds instead of polymers are used so that the rate of the SiH reaction can be more easily monitored.

The reactivity rates were compared by glc chromatograph analysis of equimolar mixtures of the olefin-containing model compound and 1,1,1,3,5,5,5-heptamethyltrisiloxane. The mixtures contained 7 mg Pt per mole of SiH compound. Platinum was added as a soluble complex formed from chloroplatinic acid and divinyltetramethyldisiloxane. The results are presented in Table 4.

TABLE 4

| Model Compound | Temperature (°C.) | Time (minutes) | Percent Model Compound Reacted |
|---|---|---|---|
| $(Me_2ViSi)_2O$ | 80 | 263 | 75 |
| $(Me_2HexSi)_2O$ | 80 | 30 | 75 |
| $Me_2ViSiCl$ | 60 | 200 | 84 |
| $Me_2HexSiCl$ | 60 | 10 | 80 |

Me represents $CH_3-$;
Vi represents $CH_2=CH-$;
Hex represents $CH_2=CH(CH_2)_4-$

EXAMPLE 11

This example is presented to illustrate the results of the simultaneous, competitive reaction of vinylsiloxane and hexenylsiloxane unit with SiH. Model compounds are used again in this experiment so that the course of the reaction can be monitored.

An equimolar mixture of 1,1,3,3-tetramethyl-1,3-divinyldisiloxane, 1,1,3,3-tetramethyl-1,3-dihexenyldisiloxane, and 1,1,1,3,5,5,5-heptamethyltrisiloxane was prepared containing 7 mg Pt per mole of SiH compound. Platinum was added as a soluble complex formed from chloroplatinic acid and divinyltetramethyldisiloxane. The mixture was heated to 80° C. and the progress of the hydrosilylation reaction was determined by glc chromatography of the reaction mixture. The glc peak area percent for the two products of the reaction are shown in Table 5. The data shows that the vinylsiloxane reacts preferentially with the SiH component when vinyl and hexenylsiloxanes are both present.

TABLE 5

| Time | Vinylsiloxane SiH Adduct | 5-Hexenylsiloxane SiH Adduct |
|---|---|---|
| 0 | 0 | 0 |
| 90 min. | 8.6 | 0.93 |
| 235 min. | 17.4 | 2.0 |

That which is claimed is:

1. A curable coating composition comprising:
   (A) a triorganosiloxane-endblocked polydiorganosiloxane polymer having a viscosity at 25° C. of at least 25 centistokes, wherein 90 to 99.5 percent of all organic radicals are methyl, from 0.5 to 10 percent of all organic radicals are unsaturated radicals independently selected from the group consisting of the vinyl radical and higher alkenyl radicals represented by the formula $-R(CH_2)_mCH=CH_2$ wherein R denotes $-(CH_2)_n-$ or $-(CH_2)_pCH=CH-$ and m has the value of 1, 2, or 3; n has the value of 3 or 6; and p has the value of 3, 4, or 5, with the proviso that at least 50 mole percent of the unsaturated radicals are higher alkenyl radicals;
   (B) a catalytic amount of a metal, hydrosilylation catalyst;
   (C) a methylhydrogenpolysiloxane cross-linking agent, compatible with (A) and having an average of at least three silicon-bonded hydrogen atoms per molecule with the hydrogen radicals being bonded to separate silicon atoms;
   (D) an effective amount of an inhibitor for the metal, hydrosilylation catalyst;
   and wherein the composition contains 0.8 to 1.5 silicon-bonded hydrogen radicals for every unsaturated radical in the composition.

2. A curable coating composition in accordance with claim 1 wherein (A) has a viscosity at 25° C. of 100 to 1000 centistokes and is a dimethylvinylsiloxane-endblocked polydiorganosiloxane polymer consisting essentially of dimethylsiloxane units and alkenylmethylsiloxane units wherein the alkenyl radicals are represented by the formula $-R(CH_2)_mCH=CH_2$ wherein R denotes $-(CH_2)_n-$ or $-(CH_2)_pCH=CH-$ and m has the value of 1, 2, or 3; n has the value of 3 or 6; and p has the value of 3, 4, or 5.

3. A curable coating composition in accordance with claim 1 wherein the unsaturated radicals in (A) are alkenyl radicals represented by the formula $-R(CH_2)_mCH=CH_2$ wherein R denotes $-(CH_2)_n-$ or $-(CH_2)_pCH=CH-$ and m has the value of 1, 2, or 3; n has the value of 3 or 6; and p has the value of 3, 4, or 5.

4. A curable coating composition in accordance with claim 3 wherein the siloxane units of (A) are selected independently from the group consisting of dimethylsiloxane units, trimethylsiloxane units, alkenylmethylsiloxane units, and alkenyldimethylsiloxane units and the composition contains 0.9 to 1.2 silicon-bonded hydrogen radicals for every unsaturated radical in the composition.

5. A curable coating composition in accordance with claim 4 wherein (A) has a viscosity at 25° C. of 100 to 1000 centistokes and the alkenyl radicals are selected from the group consisting of 5-hexenyl, 7-octenyl, 9-decenyl, and 5,9-decadienyl radicals.

6. A curable coating composition in accordance with claim 5 wherein (A) has a viscosity at 25° C. of 200 to 600 centistokes and the alkenyl radical is the 5-hexenyl radical.

7. A curable coating composition in accordance with claim 6 wherein (A) is a 5-hexenyldimethylsiloxane-endblocked copolymer of dimethylsiloxane and 5-hexenylmethylsiloxane units.

8. A curable coating composition in accordance with claim 7 wherein 1.0 to 4.0 mole percent of the diorganosiloxane units are 5-hexenylmethylsiloxane units.

9. A curable coating composition in accordance with claim 8 wherein (B) is a platinum-containing catalyst.

10. A curable coating composition in accordance with claim 9 wherein (B) is a complex of platinum and cyclopolyvinylmethylsiloxane.

11. A process for preparing a laminate of a substrate and an adhesive wherein the adhesive will release from the substrate, the process comprising the steps of:
   (I) coating a curable silicone release composition on the surface of the substrate wherein the composition comprises
      (A) a triorganosiloxane-endblocked polydiorganosiloxane polymer having a viscosity at 25° C. of at least 25 centistokes, wherein 90 to 99.5 percent of all organic radicals are methyl, from 0.5 to 10 percent of all organic radicals are unsaturated radicals independently selected from the group consisting of the vinyl radical and higher alkenyl radicals represented by the formula $-R(CH_2)_mCH=CH_2$ wherein R denotes —(CH$_2$)$_n$— or —(CH$_2$)$_p$CH═CH— and m has the value of 1, 2, or 3; n has the value of 3 or 6; and p has the value of 3, 4, or 5, with the proviso that at least 50 mole percent of the unsaturated radicals are higher alkenyl radicals;

(B) a catalytic amount of a metal, hydrosilylation catalyst;

(C) a methylhydrogenpolysiloxane cross-linking agent, compatible with (A) and having an average of at least three silicon-bonded hydrogen atoms per molecule with the hydrogen radicals being bonded to separate silicon atoms;

(D) an effective amount of an inhibitor for the metal, hydrosilylation catalyst; and wherein the composition contains 0.8 to 1.5 silicon-bonded hydrogen radicals for every unsaturated radical in the composition;

(II) curing the silicone release composition with an effective amount of heat;

(III) applying, on line, an adhesive to the silicone surface of the substrate.

12. A process in accordance with claim 11 wherein (A) has a viscosity at 25° C. of 100 to 1000 centistokes and is a dimethylvinylsiloxane-endblocked polydiorganosiloxane polymer consisting essentially of dimethylsiloxane units and alkenylmethylsiloxane units wherein the alkenyl radicals are represented by the formula —R(CH$_2$)$_m$CH═CH$_2$ wherein R denotes —(CH$_2$)$_n$— or —(CH$_2$)$_p$CH═CH— and m has the value of 1, 2, or 3; n has the value of 3 or 6; and p has the value of 3, 4, or 5.

13. A process in accordance with claim 11 wherein the unsaturated radicals in (A) are alkenyl radicals represented by the formula —R(CH$_2$)$_m$CH═CH$_2$ wherein R denotes —(CH$_2$)$_n$— or —(CH$_2$)$_p$CH═CH— and m has the value of 1, 2, or 3; n has the value of 3 or 6; and p has the value of 3, 4, or 5.

14. A process in accordance with claim 13 wherein the siloxane units of (A) are selected independently from the group consisting of dimethylsiloxane units, trimethylsiloxane units, alkenylmethylsiloxane units, and alkenyldimethylsiloxane units and the composition contains 0.9 to 1.2 silicon-bonded hydrogen radicals for every unsaturated radical in the composition.

15. A process in accordance with claim 14 wherein (A) has a viscosity at 25° C. of 100 to 1000 centistokes and the alkenyl radicals are selected from the group consisting of 5-hexenyl, 7-octenyl, 9-decenyl, and 5,9-decadienyl radicals.

16. A process in accordance with claim 15 wherein (A) has a viscosity at 25° C. of 200 to 600 centistokes and the alkenyl radical is the 5-hexenyl radical.

17. A process in accordance with claim 16 wherein (A) is a 5-hexenyldimethylsiloxane-endblocked copolymer of dimethylsiloxane and 5-hexenylmethylsiloxane units.

18. A process in accordance with claim 17 wherein 1.0 to 4.0 mole percent of the diorganosiloxane units are 5-hexenylmethylsiloxane units.

19. A process in accordance with claim 18 wherein (B) is a platinum-containing catalyst.

20. A process in accordance with claim 19 wherein (B) is a complex of platinum and cyclopolyvinylmethylsiloxane.

21. In a process for preparing a laminate of a substrate and adhesive wherein the adhesive will release from the substrate, the process comprising coating a curable silicone release composition on a surface of the substrate, thereafter curing the silicone composition, and applying an adhesive to the silicone surface of the substrate, the improvement comprising coating as the curable silicone release composition, a composition comprising (A) a triorganosiloxane-endblocked polydiorganosiloxane polymer having a viscosity at 25° C. of at least 25 centistokes, wherein 90 to 99.5 percent of all organic radicals are methyl, from 0.5 to 10 percent of all organic radicals are unsaturated radicals independently selected from the group consisting of the vinyl radical and higher alkenyl radicals represented by the formula —R(CH$_2$)$_m$CH═CH$_2$ wherein R denotes —(CH$_2$)$_n$— or —(CH$_2$)$_p$CH═CH— and m has the value of 1, 2, or 3; n has the value of 3 or 6; and p has the value of 3, 4, or 5, with the proviso that at least 50 mole percent of the unsaturated radicals are higher alkenyl radicals;

(B) a catalytic amount of a metal, hydrosilylation catalyst;

(C) a methylhydrogenpolysiloxane cross-linking agent, compatible with (A) and having an average of at least three silicon-bonded hydrogen atoms per molecule with the hydrogen radicals being bonded to separate silicon atoms;

(D) an effective amount of an inhibitor for the metal, hydrosilylation catalyst; and wherein the composition contains 0.8 to 1.5 silicon-bonded hydrogen radicals for every unsaturated radical in the composition.

22. A process in accordance with claim 21 wherein (A) has a viscosity at 25° C. of 100 to 1000 centistokes and is a dimethylvinylsiloxane-endblocked polydiorganosiloxane polymer consisting essentially of dimethylsiloxane units and alkenylmethylsiloxane units wherein the alkenyl radicals are represented by the formula —R(CH$_2$)$_m$CH═CH$_2$ wherein R denotes —(CH$_2$)$_n$— or —(CH$_2$)$_p$CH═CH— and m has the value of 1, 2, or 3; n has the value of 3 or 6; and p has the value of 3, 4, or 5.

23. A process in accordance with claim 21 wherein the unsaturated radicals in (A) are alkenyl radicals represented by the formula —R(CH$_2$)$_m$CH═CH$_2$ wherein R denotes —(CH$_2$)$_n$— or —(CH$_2$)$_p$CH═CH— and m has the value of 1, 2, or 3; n has the value of 3 or 6; and p has the value of 3, 4, or 5.

24. A process in accordance with claim 23 wherein the siloxane units of (A) are selected independently from the group consisting of dimethylsiloxane units, trimethylsiloxane units, alkenylmethylsiloxane units, and alkenyldimethylsiloxane units and the composition contains 0.9 to 1.2 silicon-bonded hydrogen radicals for every unsaturated radical in the composition.

25. A process in accordance with claim 24 wherein (A) has a viscosity at 25° C. of 100 to 1000 centistokes and the alkenyl radicals are selected from the group consisting of 5-hexenyl, 7-octenyl, 9-decenyl, and 5,9-decadienyl radicals.

26. A process in accordance with claim 25 wherein (A) has a viscosity at 25° C. of 200 to 600 centistokes and the alkenyl radical is the 5-hexenyl radical.

27. A process in accordance with claim 26 wherein (A) is a 5-hexenyldimethylsiloxane-endblocked copolymer of dimethylsiloxane and 5-hexenylmethylsiloxane units.

28. A process in accordance with claim 27 wherein 1.0 to 4.0 mole percent of the diorganosiloxane units are 5-hexenylmethylsiloxane units.

29. A process in accordance with claim 28 wherein (B) is a platinum-containing catalyst.

30. A process in accordance with claim 29 wherein (B) is a complex of platinum and cyclopolyvinylmethylsiloxane.

* * * * *